(12) United States Patent
Clement et al.

(10) Patent No.: US 8,356,723 B2
(45) Date of Patent: Jan. 22, 2013

(54) PORTABLE ICE CHEST

(76) Inventors: Brian S. Clement, Thibodaux, LA (US); Terence M. Adam, Gray, LA (US)

( * ) Notice: Subject to any disclaimer, the term of this patent is extended or adjusted under 35 U.S.C. 154(b) by 91 days.

(21) Appl. No.: 12/796,220

(22) Filed: Jun. 8, 2010

(65) Prior Publication Data

US 2011/0041545 A1 Feb. 24, 2011

Related U.S. Application Data

(60) Provisional application No. 61/235,747, filed on Aug. 21, 2009.

(51) Int. Cl.
*B65D 43/26* (2006.01)
*B65D 43/16* (2006.01)

(52) U.S. Cl. ............. 220/263; 220/592.03; 220/592.09; 220/826; 62/457.1

(58) Field of Classification Search ............. 220/592.26, 220/592.03, 263, 826, 262, 592.09; 62/457.1
See application file for complete search history.

(56) References Cited

U.S. PATENT DOCUMENTS

| | | | |
|---|---|---|---|
| 1,251,984 A | | 1/1918 | Losoncy |
| 1,828,741 A | | 10/1931 | Le Sauvage |
| 1,847,564 A | * | 3/1932 | Hood ............................ 292/255 |
| 1,882,536 A | * | 10/1932 | Weinheimer ................... 292/255 |
| 2,351,597 A | | 6/1944 | Burlin |
| 2,546,915 A | | 3/1951 | Yerkes |
| 3,201,017 A | | 8/1965 | Morrissey |
| 3,751,845 A | | 8/1973 | van Leeuwen |
| 3,958,359 A | | 5/1976 | Doughty |
| 3,979,007 A | * | 9/1976 | Thornbloom, Jr. ........... 220/522 |
| 4,303,174 A | | 12/1981 | Anderson |
| 4,324,061 A | | 4/1982 | Stepp |
| 4,667,484 A | | 5/1987 | Tarozzi et al. |
| 4,841,661 A | | 6/1989 | Moore |
| 4,892,218 A | * | 1/1990 | Reiling ......................... 220/263 |
| 5,050,335 A | | 9/1991 | Hisey |
| 5,181,612 A | | 1/1993 | Liu |
| 5,230,525 A | | 7/1993 | Delmerico et al. |
| 5,305,544 A | | 4/1994 | Testa, Jr. |
| 5,474,201 A | | 12/1995 | Liu |
| 5,531,348 A | | 7/1996 | Baker et al. |
| 5,555,740 A | | 9/1996 | Stevenson |
| 5,622,416 A | * | 4/1997 | Rainey et al. ............... 312/319.9 |
| 6,138,855 A | * | 10/2000 | Kopf ............................. 220/263 |
| 6,209,744 B1 | | 4/2001 | Gill |
| 6,626,316 B2 | | 9/2003 | Yang |
| 6,789,537 B1 | | 9/2004 | Lutz et al. |
| 7,044,323 B2 | | 5/2006 | Yang et al. |

(Continued)

FOREIGN PATENT DOCUMENTS

GB 2323019 9/1998

(Continued)

*Primary Examiner* — Mickey Yu
*Assistant Examiner* — Niki Eloshway
(74) *Attorney, Agent, or Firm* — Garvey, Smith, Nehrbass & North, L.L.C.; Brett A. North

(57) ABSTRACT

The present invention provides a portable ice chest having an improved foot operated lid or lid arrangement. The foot operated linkages are spaced away from the food holding compartment of the ice chest, being provided at end portions or in side panels of a container body. In one embodiment, a single lid or cover is provided. In another embodiment, a pair of lids or covers are provided.

9 Claims, 6 Drawing Sheets

U.S. PATENT DOCUMENTS

| | | |
|---|---|---|
| 7,086,550 B2 | 8/2006 | Yang et al. |
| 7,415,794 B1 * | 8/2008 | Thompson ..................... 43/54.1 |
| 7,703,622 B1 * | 4/2010 | Bynoe .......................... 220/263 |
| 2001/0006073 A1 * | 7/2001 | Patarra ........................... 135/16 |
| 2001/0039807 A1 | 11/2001 | Mogil |
| 2003/0019873 A1 * | 1/2003 | Nam et al. .................... 220/524 |
| 2004/0004080 A1 * | 1/2004 | Yang et al. ................... 220/263 |
| 2007/0157635 A1 * | 7/2007 | Ford ................................ 62/62 |
| 2008/0116207 A1 | 5/2008 | Yang et al. |
| 2008/0245793 A1 | 10/2008 | Hanson et al. |
| 2009/0314779 A1 * | 12/2009 | Lee ............................... 220/263 |

FOREIGN PATENT DOCUMENTS

| | | |
|---|---|---|
| JP | 54-73290 | 5/1979 |
| JP | 54-170393 | 12/1979 |

* cited by examiner

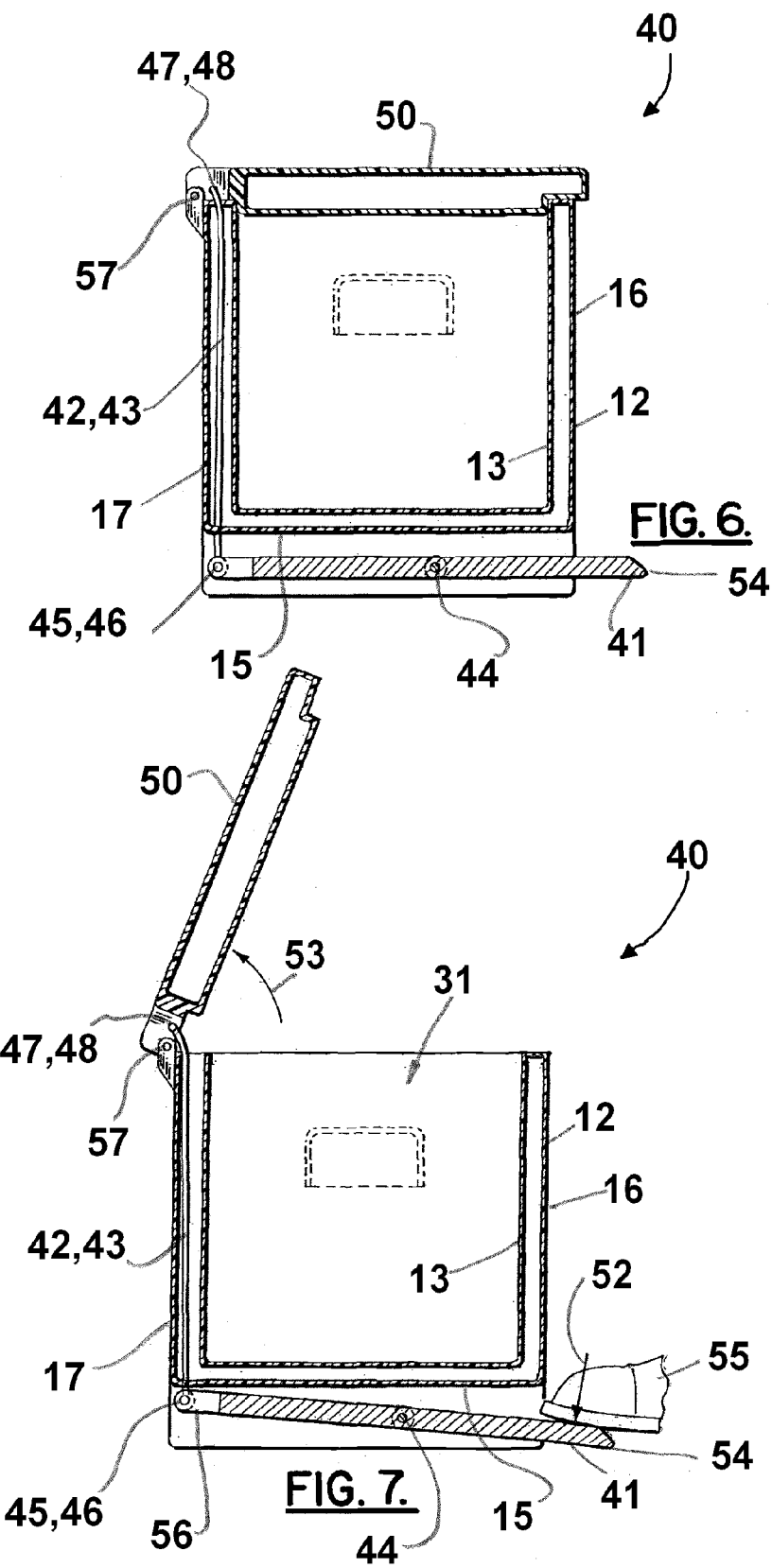

PORTABLE ICE CHEST

CROSS-REFERENCE TO RELATED APPLICATIONS

This is a non-provisional of U.S. Provisional Patent Application No. 61/235,747, filed Aug. 21, 2009. Priority of U.S. Provisional Patent Application No. 61/235,747, filed Aug. 21, 2009, is hereby claimed and such application is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a portable ice chest and more particularly to an improved portable ice chest having a lid or lid sections operable between open and closed positions with an improved foot operable linkage.

2. General Background of the Invention

Portable ice chests are commercially available and commonly used to carry many food items. One of the most popular uses of a portable ice chest is that of housing fish caught by a fisherman while on a dock or a boat. When a fisherman catches a fish, the fisherman typically is holding the fish in one hand and a rod and reel in the other hand. This presents a problem for the fisherman in that he or she must set the rod and reel down in order to open the lid of an ice chest and place the fish inside. Temporarily relinquishing the fish rod invites damages to the rod and interrupts fishing activity, hampering the fisherman in his or her attempt to present another bait or lure to the fish still swimming in the vicinity.

Several patents have issued that are directed to containers, and/or portable ice chests insulated containers, some of which are foot operated. The following table lists examples of possibly relevant patents. Some of these patents are directed to insulated containers. Other patents are directed to waste containers having a foot operated mechanism.

The following U.S. patents are incorporated herein by reference:

TABLE

| PATENT NO. | TITLE | ISSUE DATE |
| --- | --- | --- |
| 1,251,984 | Garbage Can | Jan. 01, 1918 |
| 1,828,741 | Waste Can | Oct. 27, 1931 |
| 2,351,597 | Receptacle | Jun. 20, 1944 |
| 2,546,915 | Automatic Opening and Closing Container | Mar. 27, 1951 |
| 3,201,017 | Fishing Tackle Box | Aug. 17, 1965 |
| 3,751,845 | Fishing Bucket | Aug. 14, 1973 |
| 3,958,359 | Sportsman's Combination Receptacle and Ice Chest | May 25, 1976 |
| 4,303,174 | Foot Operated Container and Covering Device | Dec. 01, 1981 |
| 4,324,061 | Casting Net Holding Device | Apr. 13, 1982 |
| 4,667,484 | Cooler with Pocketed Lid | May 26, 1987 |
| 4,841,661 | Fisherman's Combination Chest | Jun. 27, 1989 |
| 5,050,335 | Minnow and Fish Preserving Container | Sep. 24, 1991 |
| 5,181,612 | Compact Collapsible Lunch Box | Jan. 26, 1993 |
| 5,230,525 | Step-On Waste Container | Jul. 27, 1993 |
| 5,305,544 | Bait Storage, Cooler and Tackle Holder Arrangement | Apr. 26, 1994 |
| 5,474,201 | Structure of a Foot Trash Can | Dec. 12, 1995 |
| 5,531,348 | Child Resistant Step-On Receptacle | Jul. 02, 1996 |
| 6,209,744 | Hinge-Doored Receptacle | Apr. 03, 2001 |
| 2001/0039807 | Divided Insulated Container | Nov. 15, 2001 |
| 6,626,316 | Trash Can Assembly with Toe-Kick Recess | Sep. 30, 2003 |
| 6,789,537 | Foot Operated Grill Cover Lift | Sep. 14, 2004 |
| 7,044,323 | Detachable Foot Pedal for Trash Can | May 16, 2006 |
| 7,086,550 | Trash Can Assembly with Locking Lid | Aug. 08, 2006 |
| 2008/0116207 | Trash Can Assembly with Bag Trim | May 22, 2008 |
| 2008/0245793 | Insulated Container with Foot-Operated Lid | Oct. 09, 2008 |
| GB 2,323,019 | Pedal Bin | Sep. 16, 1998 |

BRIEF SUMMARY OF THE INVENTION

The present invention provides a portable ice chest having a container body comprised of an outer shell and an inner shell with an insulated layer in between the inner and outer shells.

The container body has a bottom panel, front panel, rear panel and left and right side panels.

The container body provides an open top that is covered with one or two lids. Each of the lids is affixed to the container body with a pivotal connection or hinge. In one embodiment, the lids include a pair of lids that are attached to the left and right side panels respectively. In another embodiment, a single lid is attached to the top of the rear panel.

Operators are provided that include pedals or foot pedals that enable a user to open one or both of the lids with foot applied pressure. In one embodiment, the pedal extends substantially the length of the ice chest or cooler, extending substantially from one end panel to the other. In this embodiment, a pair of linkages are provided at the left and right side panels for opening the lid.

In another embodiment, first and second linkages are provided, one linkage being provided on the left end panel and the other linkage provided on the right end panel or side panel. In either case, the mechanism for elevating the lid or lids does not invade the cooling compartment which contains items such as a plurality of fish and a mass of ice. In this fashion, neither the fish nor the ice impede use of the linkage or linkages.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 6 is a sectional view of the alternate embodiment of the apparatus of the present invention; and FIG. 7 is a sectional view of the alternate embodiment of the apparatus of the present invention.

DETAILED DESCRIPTION OF THE INVENTION

Figure 1:
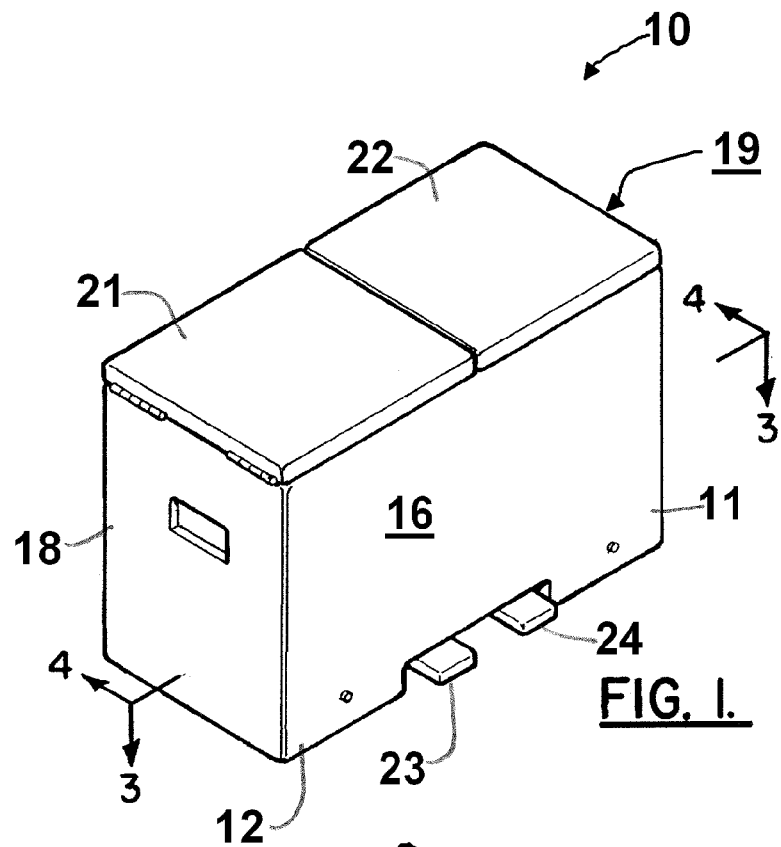
FIG. 1 is an elevation view of the preferred embodiment of the apparatus of the present invention.
Figure 2:
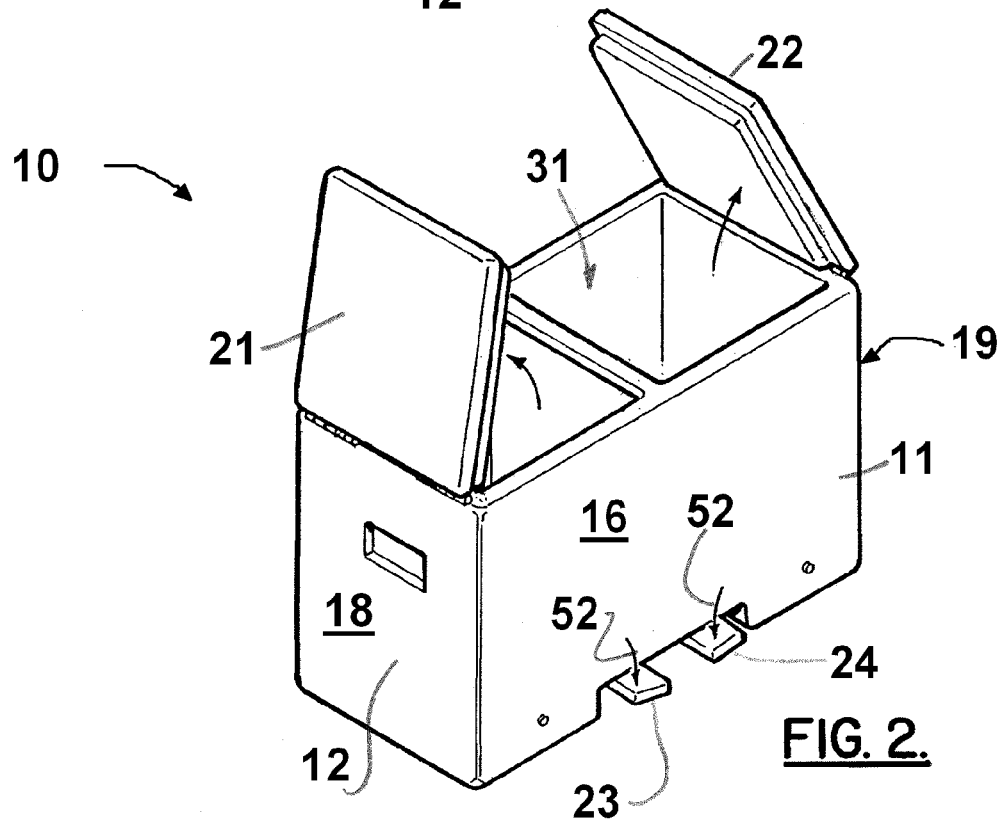
FIG. 2 is an elevation view of the preferred embodiment of the apparatus of the present invention.
Figure 3:
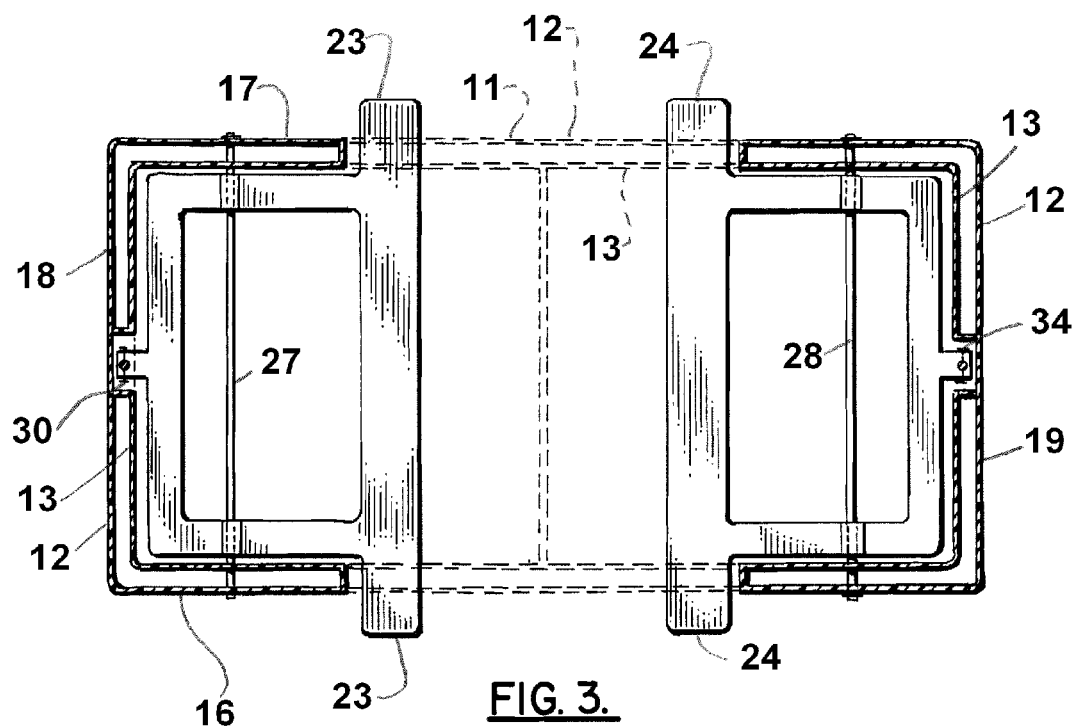
FIG. 3 is a sectional view of the preferred embodiment of the apparatus of the present invention.
Figure 4:
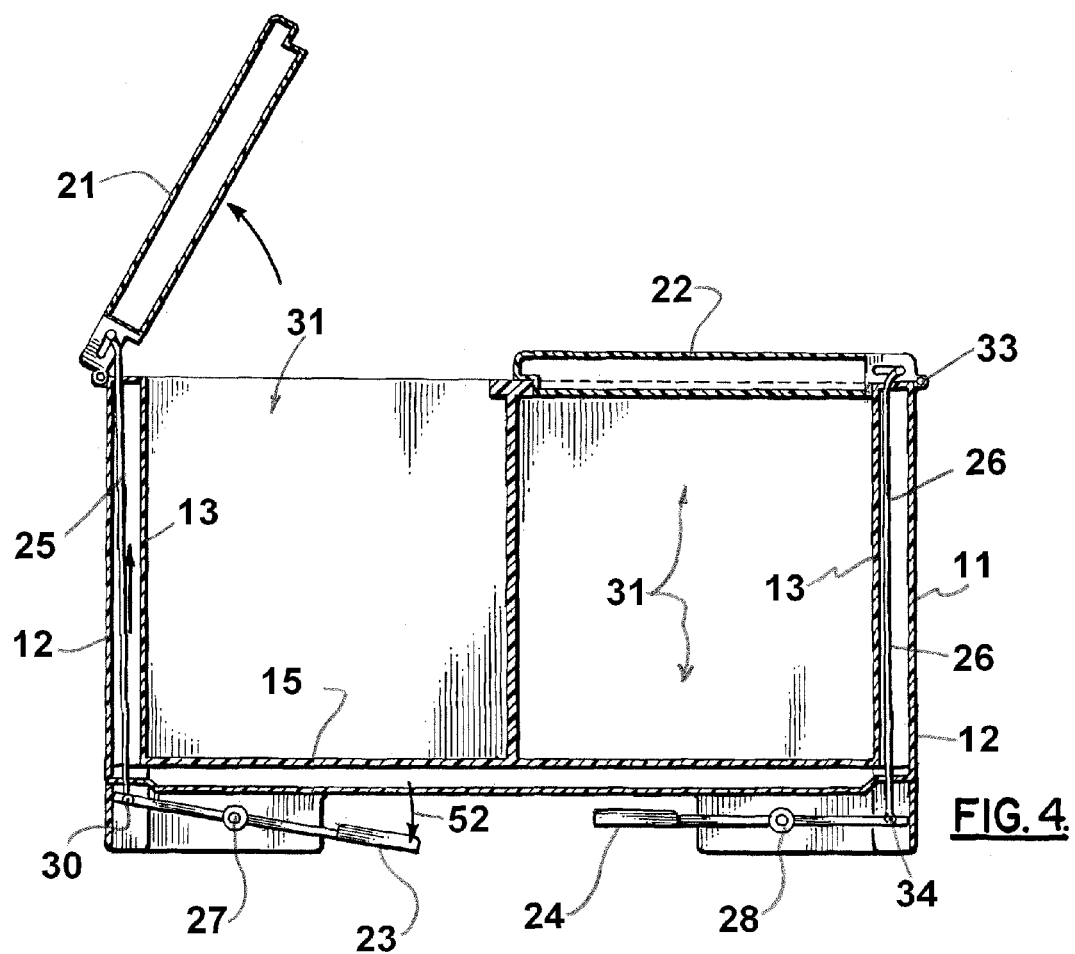
FIG. 4 is a sectional view of the preferred embodiment of the apparatus of the present invention.

FIGS. 1-7 show a portable ice chest that is foot operated and wherein a unique operating mechanism is provided. In FIGS. 1-4, the portable ice chest 10 provides container body 11 having an outer shell 12 and an inner shell 13. An insulative layer 14 of air, foam, or other insulative material is provided in between the outer shell 12 and the inner shell 13.

Container body 11 provides a bottom panel 15, front panel 16, rear panel 17 and side panels 18, 19. The side panels can include left side panel 18 and right side panel 19.

Container body 11 has an open top 20 to be used to access one or more cool compartments 31. A pair of lids 21, 22 or covers are each pivotally attached to container body 11 at pivots 32, 33 respectively.

Each lid or cover 21, 22 is operable with a foot pedal. The foot pedal 23 opens lid or cover 21. The foot pedal 24 operates or opens the lid or cover 22. Linkages are provided for connecting each lid 21, 22 with its foot pedal 23, 24. The linkage 25 extends between foot pedal 23 and lid or cover 21. Linkage 26 extends between foot pedal 24 and lid or cover 22.

Pivotal connections join each foot pedal to its linkage. Each foot pedal 23, 24 is pivotally attached to container body 11. Foot pedal 23 attaches to container body 11 at pivotal connection 27. Foot pedal 23 also forms a pivotal attachment to linkage 25 at pivotal connection 30.

Foot pedal 24 is pivotally attached to container body 11 at pivotal connection 28. Foot pedal 24 forms a pivotal attachment to linkage 26 at pivotal connection 34.

In order to elevate either of the lids or covers 21, 22 a user simply depresses the foot pedal 23 or 24 associated with the lid or cover 21, 22. A fisherman can open either end 21 or 22 without opening the other end 21 or 22. The other lid or cover 21, 22 remains closed. This is important when depositing fish in the ice chest because the closed lid or cover 21, 22 helps prevent escape of the fish after it has been deposited within the compartment 31 of the container body 11. An optional (preferably removable) divider or baffle 35 can be used to divide the cooled section 31, so that contents can be segregated such as the fish caught by first and second fishermen, or fish separated from food and drinks.

By placing the foot pedals 23, 24 on opposing ends or side portions of the container body 11, the ice chest 10 of the present invention can be accessed from two different directions such as by fisherman that are positioned on opposing sides of the ice chest such as on opposite sides of a boat. Thus, one fisherman can be fishing on the port side of a boat and deposit his or her fish by depressing the foot pedal 23. Another fisherman can be fishing on the starboard side of the boat and deposit his or her fish by depressing the foot pedal 24. This feature has great importance for center console style fishing boats that typically provide an ice chest in front of the center console, the ice chest being accessible from either the port side or starboard side of the boat. This feature is also important on boats that have ice chests at the rear of the boat, next to the stern. Such as a stern mounted portable ice chest 10 is also accessible by a first fisherman using the pedal closest to the port side of the boat and a second fisherman using the pedal closest to the starboard side of the boat.

Figure 5:
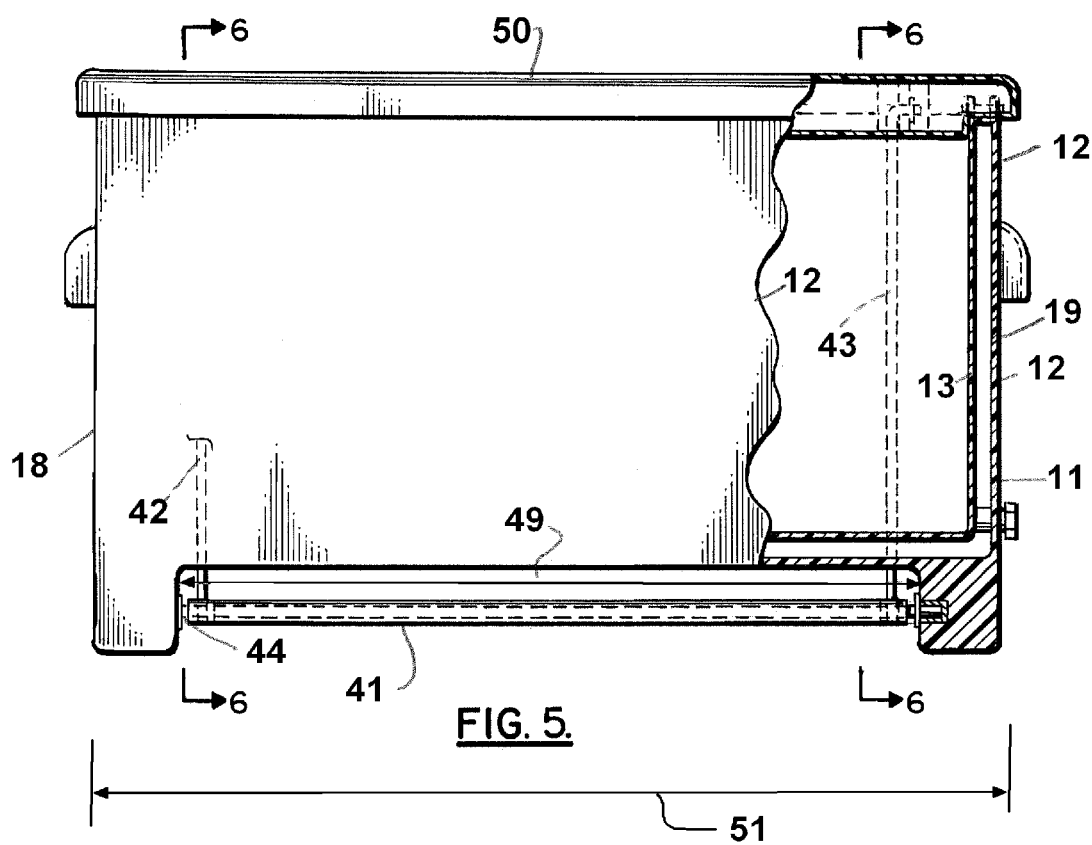
FIG. 5 is a sectional view of the alternate embodiment of the apparatus of the present invention.

FIGS. 5-7 show a second embodiment of the apparatus of the present invention, designated generally by the numeral 40. Portable ice chest 40 can utilize the same container body 11 of the present invention. In FIGS. 5-7 portable ice chest 40 provides a full length foot pedal 41 that extends almost the full width 51 of body 11 from one side panel 18 to the other side panel 19 as seen in FIG. 5. The single full length foot pedal 41 operates a pair of linkages 42, 43. Linkages 42, 43 can be pushrods. The foot pedal 41 is attached to the container body 11 at pivotal connection 44. The full length foot pedal 41 attaches to a first linkage 42 at pivotal connection 45 and to a second linkage 43 at pivotal connection 46. Each linkage 42, 43 attaches to a common lid 50 with a pivotal connection. A pivotal connection is formed at 47 between lid 50 and linkage 42. A pivotal connection 48 is formed between lid 50 and linkage 43.

In FIGS. 5-7, arrow 49 illustrates that foot pedal 41 extends substantially the full length of container body 11, spanning at least half, preferably two thirds or more preferably three fourths of the distance between left side panel 18 and right side panel 19. When a user steps on pedal 41 at its front end portion 54 the user's foot 55 moves downwardly with the front end portion 54 as indicated by arrow 52 in FIGS. 2, 4 and 7. The foot pedal 41 pivots at pivot 45, 46 thus elevating the rear end portion 56 of pedal 41 and elevating each of the linkages or pushrods 42, 43 as shown in FIG. 7. Lid 50 is hingedly connected to body 11 at hinge 57. The hinge 57 is positioned behind the pivotal connections 47, 48 as shown in FIGS. 6 and 7. Thus, when the linkage or pushrod 42, 43 is elevated in FIG. 7, the lid 50 also elevates and pivots about its hinge 57 as shown by arrow 53 in FIG. 7 thus opening the compartment or interior 31 of ice chest 40. When the user removes his or her foot 55, the weight of the lid 50 closes the lid via gravity.

In one embodiment a single lid can be included. In one embodiment the upper brace for the two portion lid can be omitted making the interior a whole/single volume.

Figure 8:
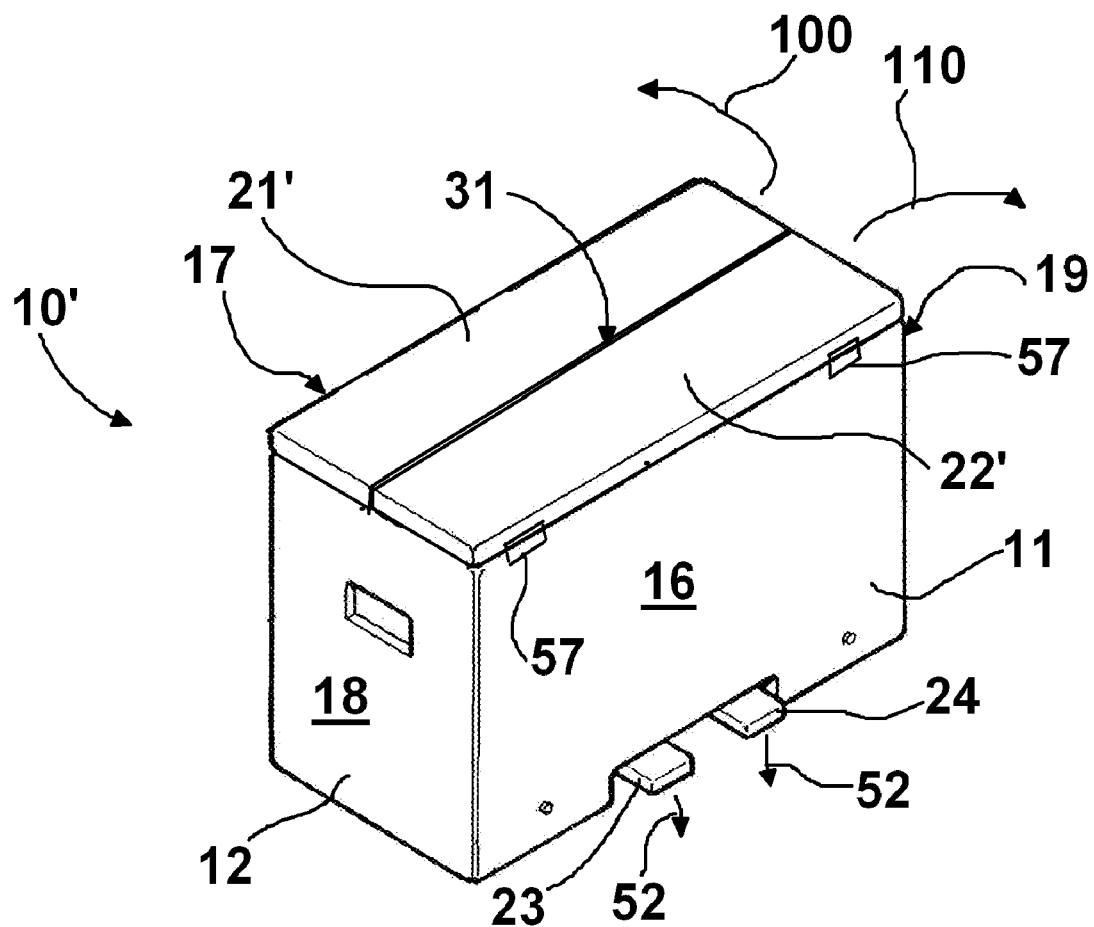
FIG. 8 is a perspective view of a two section lid embodiment.

FIG. 8 shows an alternative lid construction 21', 22' of the embodiment shown in FIGS. 1-4. Container body 11 provides a bottom panel 15, front panel 16, rear panel 17 and side panels 18, 19. The side panels can include left side panel 18 and right side panel 19. Container body 11 has an open top 20 to be used to access one or more cool compartments 31. A pair of lids 21', 22' or covers are each pivotally attached to container body 11 at hinges 57 (the hinges 57 for lid cover 21' are not shown as they are located on rear panel 17)

Each lid or cover 21', 22' is operable with a foot pedal. The foot pedal 23 opens lid or cover 21'. The foot pedal 24 operates or opens the lid or cover 22'. Similar to the construction shown in FIGS. 1-4, linkages are provided for connecting each lid 21', 22' with its foot pedal 23, 24. The linkage 25 extends between foot pedal 23 and lid or cover 21. Linkage 26 extends between foot pedal 24 and lid or cover 22. In FIG. 8, the pivoting connection 30 for pedal 23/lid 21' will be located on next to/under rear panel 17 instead of left side panel 18, and the pivoting connection 34 for pedal 24/lid 22' will be located next to/under front panel 16 instead of right side panel 19. In this manner lids 21' and 22' can open respectively in the direction of arrows 100,110 as show in FIG. 8.

Also alternatively the foot pedals 23,24 and their associated linkage systems connected to lids 21',22' in FIG. 8 can be re-positioned to protrude from side panel 18 (effectively rotating these linkage systems by 90 degrees). Dimensional changes would have to be made to account for the differing lengths of the front/rear to side panels.

In an alternative construction of two lid 21',22' container 10' two sets of opposed pedals 41 and 41' and associated linkage systems for opening lids 21' and 22' can be used. These opposed linkage system can be substantially the same as shown in the single lid 50 embodiment disclosed in FIGS. 5-7. For lid 21' pedal 41 and its associated linkage system can be used in substantially the same configuration shown in FIGS. 5-7 (in this case lid 21' would be one half the size of lid 50 as shown in FIG. 8). For lid 22' a pedal 41' and its associate linkage system could be used but with peal 41' facing in the opposite direction of pedal 41 shown in FIG. 6 (protruding from rear panel 17 instead of front panel 16). That is pedal 41' connected to lid 22' would protrude from rear panel 17 with the pivotal connections 45',46' being under front panel 16. In this embodiment pivot point 44 would preferably be located in the center of bottom panel 15.

The following is a list of parts and materials suitable for use in the present invention.

PARTS LIST

| Part Number | Description |
| --- | --- |
| 10 | portable ice chest |
| 11 | container body |
| 12 | outer shell |
| 13 | inner shell |
| 14 | insulative layer |
| 15 | bottom panel |
| 16 | front panel |
| 17 | rear panel |
| 18 | left side panel |
| 19 | right side panel |
| 20 | open top |
| 21 | lid/cover |
| 22 | lid/cover |
| 23 | foot pedal |
| 24 | foot pedal |
| 25 | linkage/pushrod |
| 26 | linkage/pushrod |
| 27 | pivotal connection |
| 28 | pivotal connection |
| 29 | pivotal connection |
| 30 | pivotal connection |
| 31 | compartment/interior |
| 32 | pivot/hinge |
| 33 | pivot/hinge |
| 33 | pivotal connection |
| 34 | pivotal connection |
| 35 | baffle/divider |
| 40 | portable ice chest |
| 41 | foot pedal |
| 42 | linkage |
| 43 | linkage |
| 44 | pivotal connection |
| 45 | pivotal connection |
| 46 | pivotal connection |
| 47 | pivotal connection |
| 48 | pivotal connection |
| 49 | arrow |
| 50 | lid |
| 51 | width |
| 52 | arrow |
| 53 | arrow |

-continued

| Part Number | Description |
| --- | --- |
| 54 | front end portion |
| 55 | user's foot |
| 56 | rear end portion |
| 57 | hinge |
| 100 | arrow |
| 110 | arrow |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A portable ice chest, comprising:
   a) a container body having an outer shell, an inner shell and an insulative layer in between the inner and outer shells;
   b) the container body having a bottom panel, front panel, rear panel, left and right side panels and an open top;
   c) a pair of lids affixed to the container body, each lid pivotally attached to the container body at a side panel, one lid attached to the left side panel, the other lid attached to the right side panel;
   d) a first operator that includes a first pedal and that enables a user to open a first of the lids with foot applied pressure on the first pedal;
   e) a second operator that includes a second pedal that enables a user to open a second of the lids with foot applied pressure on the second pedal;
   f) a pair of linkages that connect each pedal to a lid, each said linkage being positioned at a side panel; and
   g) wherein the first pedal and second pedal each extend substantially from the front to the rear panels, and can be accessible from either the front or rear panel of the container.

2. The portable ice chest of claim 1 wherein each linkage occupies a position in between the inner and outer shells at a side panel.

3. The portable ice chest of claim 1 wherein each linkage includes a pushrod that is located at a side panel and in between the inner shell and the outer shell.

4. The portable ice chest of claim 3 wherein the pushrod has a spring portion.

5. The portable ice chest of claim 1 wherein each pedal is pivotally attached to the container body.

6. The portable ice chest of claim 1 wherein each linkage includes a spring.

7. The portable ice chest of claim 1, wherein the pedals are located on the same side of front panel.

8. The portable ice chest of claim 1, wherein the pedals are located on the same side of rear panel.

9. The portable ice chest of claim 1, wherein each of the lids can be independently opened while the remaining lid remains closed.

* * * * *